Feb. 19, 1929.

W. WEINRICH

INSECT TRAP

Filed Dec. 14, 1927

1,703,022

INVENTOR
William Weinrich
BY
ATTORNEY

Patented Feb. 19, 1929.

1,703,022

UNITED STATES PATENT OFFICE.

WILLIAM WEINRICH, OF HONOLULU, TERRITORY OF HAWAII.

INSECT TRAP.

Application filed December 14, 1927. Serial No. 239,995.

This invention relates to improvements in insect traps generally, and more particularly to a type of such traps adapted to prevent the propagation of mosquitoes.

The invention has for its principal object to provide for a trap of the class set forth, and one of a nature to readily allow for the mature female mosquito to lay her eggs, but which will with equal readiness prevent the escape of the larvæ after the eggs have hatched.

Another object of the invention is to provide for a trap structure as hereinbefore characterized, and one wherein the mosquito larvæ, after being hatched in a solution contained in the trap, are suffocated in their endeavors to reach the surface of the solution for air, and hence they die.

With the foregoing and other equally important objects in view, the invention resides in the certain new and useful combinations, constructions and arrangements of parts as will be hereinafter more fully described, set forth in the appended claims, and illustrated in the accompanying drawing, in which:

Figure 1:
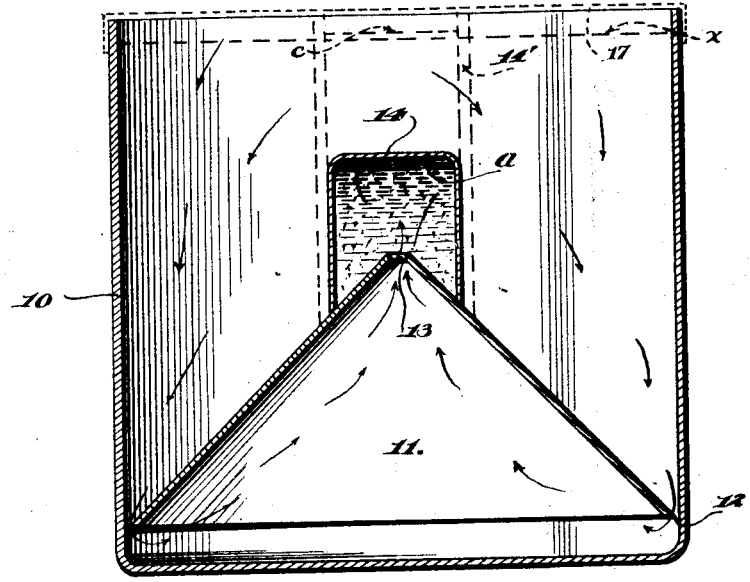
Figure 1 is a vertical section through one form of the trap.

Referring to the drawing, and more particularly to Figure 1 thereof, the embodiment of the invention as shown therein comprises a container 10, preferably in the form of a cylindrical receptacle, or other tube-like body, which is open at its upper side. Supported within the container 10 is an inverted funnel-shaped body 11, having its larger end of a slightly less diameter than the interior diameter of the container. This lower larger end of the body 11 is disposed concentrically of the inner wall of the container 10, and is spaced slightly above the bottom wall thereof in a manner to provide for an annular passageway 12 about its edge. The upper end or apex of the conical body 11 is open, as at 13, and this opening 13 communicates with the interior of an inverted cylindrical body or receptacle 14, which may be in the form of a tumbler having its lower open end engaged over the smaller end or apex of the conical body 11.

In use, the container 10 will be filled with a solution favorable to the use of the same for breeding purposes by mosquitoes, which solution will also fill the cylindrical receptacle or tumbler 14 and the interior of the conical body 11. The receptacle or tumbler 14 may have a small quantity of oil placed therein, which will form a film, as at $a$, on the surface of the solution filling the same. In accordance with the known characteristics and habits of the mosquito larvæ, when eggs deposited in the solution are hatched, the larvæ will swim to the bottom of the container 10 for food, and will return to the surface of the solution to breathe. As they swim downward, the larvæ will enter the annular passageway 12, and pass beneath the conical body 11, and, when attempting to return to the surface of the solution, a large majority of the same will pass upwardly through the opening 13 in the upper end or apex of the body 11, and into the inverted receptacle or tumbler 14 where, for the lack of air, they die.

Figure 2:
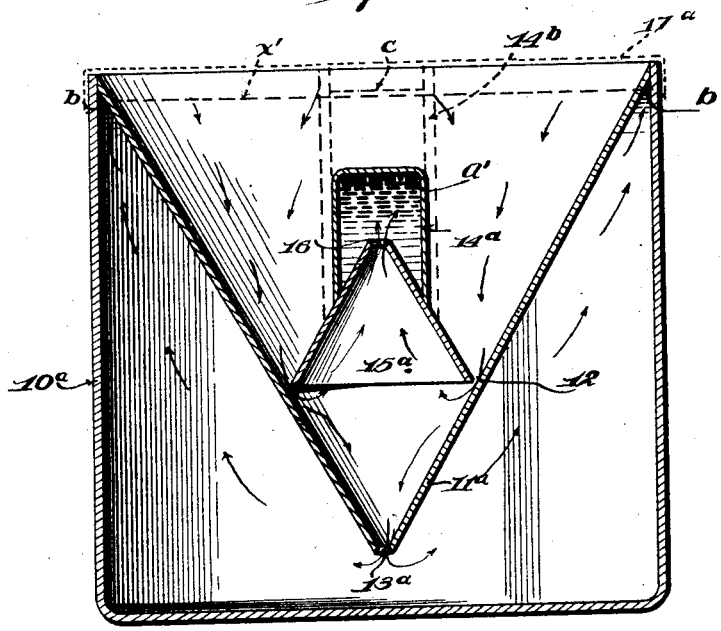
Figure 2 is a similar view through a second or preferred embodiment thereof.

Referring now to Figure 2, wherein is shown the second or preferred form of the invention, the container $10^a$ is substantially of the form as in the first instance, but the funnel-like or conical body $11^a$ is positioned inwardly of the same with its smaller end or apex pointing downward, while its upper larger end is of a diameter to snugly engage or seat immediately within the open end of the container. The opening $13^a$ in the lower end or apex of the conical body $11^a$ is positioned in slightly spaced relation above the bottom wall of the container 10 to allow the breeding solution to fill the enclosed interior of the latter. A smaller and inverted conical body $15^a$ is supported within the interior of the larger conical body $11^a$, with its lower and larger end disposed in slightly spaced, concentric relation with respect thereto to provide for a passageway $12^a$, corresponding to the passageway 12, as in the first instance of the invention, therebetween. The upper end or apex of this smaller conical body $15^a$ is provided with an opening $16^a$, which communicates with the interior of an inverted cylindrical receptacle or tumbler $14^a$. After the manner as in the first instance, this receptacle or tumbler $14^a$ has its lower open end engaged over the upper end or apex of the smaller conical body $15^a$. As in the first instance of the invention, a suitable breeding solution is poured in the container $10^a$, until it is filled or nearly so, and, when filled, the solution also fills the receptacle or tumbler $14^a$. Sufficient oil, however, is placed within the container 10ª to provide for a film of the same on the surface of the solution, as at $b$, to fill the space between the conical body 11ª and the interior of the container 10ª enclosed thereby to provide an air-tight seal at the point of contact of the upper larger end of the conical body 11ª with the wall of the container 10ª. Also, a small quantity of oil is placed within the receptacle or tumbler 14ª to provide for a similar film of oil, as at $a'$, on the surface of the solution filling the latter.

In this latter form of the device, mosquitoes will deposit their eggs in the solution, and the larvæ, when the eggs are hatched, will swim toward the bottom of the container 10ª in search of food, and will traverse the passageway 12ª and pass downwardly through the opening 13ª, in the lower end or apex of the conical body 11ª. Here, when they attempt to return to the surface of the solution, some of them will swim upward within the space between the inner wall of the container 10ª and the opposed wall of the conical body 11ª, where they will be suffocated for lack of air, while others will pass upwardly through the opening 13ª, in the larger conical body 11ª, and from thence upwardly through the opening 16ª in the upper end or apex of the smaller conical body 15ª and into the receptacle or tumbler 14ª, where they, in turn, will also be suffocated for lack of air. It is, of course, obvious that a few of the larvæ may escape upwardly through the passageway 12ª, and thus return to the surface of the solution, but the arrangement of the parts are such that their chances are minimized, or otherwise rendered impossible.

It is to be noted that in either instance of the invention, the receptacles or tumblers 14 and 14ª may have substituted for the same suitable lengths of tubing, or other forms of hollow cylindrical bodies, open at both ends, in which case, the upper open end of the latter will be projected slightly above the surface of the solution in the containers 10 or 10ª, so that a film of oil $c$ may be floated on the surface of the solution filling the cylindrical bodies to the level of the solution in the containers 10 or 10ª. Such substitute cylindrical bodies are indicated by broken lines in both Figures 1 and 2 of the drawing, and that of Figure 1 is designated by the numeral 14′, while the one in Figure 2 is designated as at 14ᵇ. A cover 17 or 17ª may be provided for either or both of the forms of the traps 10 and 10ª, as is indicated, for use when transporting the traps from one point of use to another, or to prevent the same from filling to the point of overflow when it is raining.

Without further description, it is thought that the features and advantages of the invention will be readily apparent to those skilled in the art, and it will of course be understood that changes in the form, proportion and minor details of construction may be resorted to, without departing from the spirit of the invention or its scope as claimed.

Having thus fully described the invention, what is claimed is:

1. A mosquito trap comprising a container open at its upper end and normally filled with a breeding solution, and means immersed in the breeding solution for trapping and suffocating the hatched larvæ in their efforts to return to the surface of the breeding solution for air.

2. A mosquito trap comprising a container open at its upper end and normally filled with a breeding solution, and means supported within said container and open at its lower end to house a portion of the breeding solution and to trap therein and suffocate the hatched larvæ in their efforts to return to the surface of the breeding solution for air.

3. A mosquito trap comprising a container open at its upper end and normally filled with a breeding solution, a hollow body supported within said container, said body having its lower end open for the ingress thereto of the breeding solution from said container and for the trapping within the same of the hatched larvæ in their efforts to return to the surface of the breeding solution, and means closing the upper end of said body to prevent contact of the upper surface of the solution within the same with the air whereby the larvæ rising to the surface of the solution within said body will be suffocated.

4. A mosquito trap comprising a container open at its open end and normally filled with a breeding solution, a hollow body supported within said container, said body having its lower end open for the ingress thereto of the breeding solution from said container and for the trapping within the same of the hatched larvæ in their efforts to return to the surface of the breeding solution, and a film of oil closing the upper end of said body to prevent contact of the upper surface of the solution within the same with the air, whereby the larvæ rising to the surface of the solution within said body will be suffocated.

5. A mosquito trap comprising a container open at its upper end and normally filled with a breeding solution, a hollow body supported within said container, said body having its upper end closed and its lower end open for the ingress thereto of a portion of the breeding solution from the container and for trapping within the same of the hatched larvæ in their efforts to return to the surface of the breeding solution, and a film of oil on the surface of the breeding solution within said body to provide an air seal thereto.

6. A mosquito trap comprising a cylindrical container open at its upper end and normally filled with a breeding solution, a conical body disposed within said container and having the peripheral edge of its lower larger end arranged in closely spaced relation to the opposed wall of the container to form a restricted passageway therebetween, said conical body being open at its apex, and a cylindrical receptacle having its lower end open and engaged over the apex end of said conical body, the breeding solution from the container filling the interior of said conical body and said receptacle.

7. A mosquito trap comprising a cylindrical container open at its upper end and normally filled with a breeding solution, a conical body disposed within said opening and having the peripheral edge of its larger end arranged in substantially contacting relation with the inner wall of the container and substantially in the plane of the normal level of the breeding solution within the latter, the lower apex end of said body being open, an inverted conical body within said first mentioned conical body and having its larger end disposed in closely spaced relation with respect to the opposed wall thereof, the apex end of said last-mentioned conical body being open, and a cylindrical receptacle open at its lower end and engaged over the apex end of said last-mentioned conical body, the interiors of said conical bodies and said receptacle being filled with the breeding solution from said container.

8. A mosquito trap comprising an open container normally filled with a liquid, and means immersed in the liquid for trapping and suffocating the hatched larvæ in their efforts to reach the surface of the liquid for air.

WILLIAM WEINRICH.